United States Patent
Lien

(10) Patent No.: US 10,037,090 B2
(45) Date of Patent: Jul. 31, 2018

(54) MICRO TOUCH PEN STRUCTURE INCLUDING PEN CORE WITH STOP PORTION

(71) Applicant: Wacom Co., Ltd., Saitama (JP)

(72) Inventor: Chien-Chia Lien, Miaoli County (TW)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 15/473,107

(22) Filed: Mar. 29, 2017

(65) Prior Publication Data

US 2017/0199590 A1 Jul. 13, 2017

Related U.S. Application Data

(63) Continuation of application No. 14/181,783, filed on Feb. 17, 2014, now Pat. No. 9,632,596.

(30) Foreign Application Priority Data

Dec. 4, 2013 (TW) ............................. 102222747 U

(51) Int. Cl.
*G06F 3/0354* (2013.01)
(52) U.S. Cl.
CPC ................. *G06F 3/03545* (2013.01)
(58) Field of Classification Search
CPC .. G06F 3/03545–3/03546; G06F 2203/04101; G06F 2203/04108
See application file for complete search history.

(56) References Cited

U.S. PATENT DOCUMENTS

| | | | |
|---|---|---|---|
| 5,576,502 A * | 11/1996 | Fukushima | G06F 3/03545 178/19.01 |
| 6,187,026 B1 * | 2/2001 | Devlin | A61B 17/2909 606/205 |
| 2010/0212976 A1 | 8/2010 | Baba | |
| 2011/0193827 A1 | 8/2011 | Liang | |
| 2014/0306940 A1 | 10/2014 | Fukushima et al. | |

* cited by examiner

*Primary Examiner* — Sanghyuk Park
(74) *Attorney, Agent, or Firm* — Seed IP Law Group LLP

(57) ABSTRACT

A micro touch pen structure includes a casing unit, a circuit unit, a first electromagnetic unit, a pen core unit, a second electromagnetic unit and an elastic unit. The circuit unit is disposed inside the pen-shaped casing structure. The first electromagnetic unit includes a first hollow electromagnetic body inside the pen-shaped casing structure and an electromagnetic coil wound around the first hollow electromagnetic body and electrically connected to the circuit unit. The pen core unit includes a first movable portion passing through the first hollow electromagnetic body, a second movable portion partially exposed from the pen-shaped casing structure, and a stop portion connected between the first and the second movable portions. The second electromagnetic unit includes a second hollowing electromagnetic body fixed inside the pen-shaped casing structure and disposed around the first movable portion. The elastic unit is disposed between the first movable portion and a fixed structure.

6 Claims, 7 Drawing Sheets

MICRO TOUCH PEN STRUCTURE INCLUDING PEN CORE WITH STOP PORTION

BACKGROUND OF THE INVENTION

1. Field of the Invention

The instant disclosure relates to a micro touch pen structure, and more particularly to a micro touch pen structure having a stopper for stopping or retaining an electromagnet.

2. Description of Related Art

Conventional touch control devices may be classified into three types: resistive, electromagnetic and capacitive. Operation with a resistive touch control device requires a rigid pen tip to apply a significant force on the resistive touch control device in a very small area to accomplish deformation of the resistive touch sensor, and an electromagnetic touch control device requires a special battery powered pen for input; while the working principle of a capacitive touch control device relies on capacitive coupling, which takes place as soon as the capacitive touch sensor is touched by a conductive object, and the touch position can then be identified according to the variation in capacitance at the touch point. Therefore, a capacitive touch control device does not require an input pen that consumes electricity. Nor is it necessary to subject a capacitive touch sensor to concentrated pressure application for deformation, and thus a capacitive touch control device has a longer service life. Furthermore, mass production of capacitive touch control devices requires lower costs due to its simple construction, less components and higher yield rate.

A capacitive touch control device can be operated in many ways. The most common of all is using a conductor, for example a finger or a pen, to touch or slide on the surface of the capacitive touch control device, for the capacitive touch sensor thereof to generate a response signal. However, as capacitive touch control devices find more and more applications, the lower precision on position detection tends to hinder smoothness of operation where more precise and more efficient detection is required, such as in handheld devices. In order to enable enhanced precision on position detection, many people choose to use pens for capacitive touch input.

SUMMARY OF THE INVENTION

One aspect of the instant disclosure relates to a micro touch pen structure having a stopper for stopping or retaining an electromagnet.

One of the embodiments of the instant disclosure provides a micro touch pen structure, comprising: a casing unit, a circuit unit, a first electromagnetic unit, a pen core unit, a second electromagnetic unit and an elastic unit. The casing unit includes a pen-shaped casing structure. The circuit unit is disposed inside the pen-shaped casing structure. The first electromagnetic unit is fixed inside the pen-shaped casing structure and electrically connected to the circuit unit, wherein the first electromagnetic unit includes a first hollow electromagnetic body fixed inside the pen-shaped casing structure and at least one electromagnetic coil wound around the first hollow electromagnetic body and electrically connected to the circuit unit. The pen core unit is movably disposed inside pen-shaped casing structure, wherein the pen core unit includes a first movable portion passing through the first hollow electromagnetic body, a second movable portion partially exposed from the pen-shaped casing structure, and a stop portion connected between the first movable portion and the second movable portion. The second electromagnetic unit includes a second hollowing electromagnetic body fixed inside the pen-shaped casing structure and disposed around the first movable portion, wherein the second hollowing electromagnetic body is abutted against the stop portion and disposed between the first electromagnetic unit and the stop portion. The elastic unit is disposed inside the pen-shaped casing structure and between the first movable portion and a fixed structure that is disposed inside the pen-shaped casing structure.

Another one of the embodiments of the instant disclosure provides a micro touch pen structure, comprising: a casing unit, a circuit unit, a first electromagnetic unit, a pen core unit, a second electromagnetic unit and an elastic unit. The casing unit includes a pen-shaped casing structure. The circuit unit is disposed inside the pen-shaped casing structure. The first electromagnetic unit is fixed inside the pen-shaped casing structure and electrically connected to the circuit unit, wherein the first electromagnetic unit includes a first hollow electromagnetic body fixed inside the pen-shaped casing structure and at least one electromagnetic coil wound around the first hollow electromagnetic body and electrically connected to the circuit unit. The pen core unit is movably disposed inside pen-shaped casing structure, wherein the pen core unit includes a first movable portion passing through the first hollow electromagnetic body and a second movable portion connected to the first movable portion and partially exposed from the pen-shaped casing structure. The second electromagnetic unit includes a second hollowing electromagnetic body fixed inside the pen-shaped casing structure and disposed around the first movable portion, wherein the second hollowing electromagnetic body is disposed between the first electromagnetic unit and the second movable portion. The elastic unit is disposed inside the pen-shaped casing structure and between the first movable portion and a fixed structure that is disposed inside the pen-shaped casing structure, wherein the elastic unit includes at least one first elastic element adjacent to the first movable portion and at least one second elastic element far away from the first movable portion, the at least one first elastic element and the at least one second elastic element are connected in series and between the first movable portion and the fixed structure, and the elastic coefficient of the at least one first elastic element is smaller than that of the at least one second elastic element.

Yet another one of the embodiments of the instant disclosure provides a micro touch pen structure, comprising: a casing unit, a circuit unit, a first electromagnetic unit, a pen core unit, a second electromagnetic unit and an elastic unit. The casing unit includes a pen-shaped casing structure. The circuit unit is disposed inside the pen-shaped casing structure. The first electromagnetic unit is fixed inside the pen-shaped casing structure and electrically connected to the circuit unit, wherein the first electromagnetic unit includes a first hollow electromagnetic body fixed inside the pen-shaped casing structure and at least one electromagnetic coil wound around the first hollow electromagnetic body and electrically connected to the circuit unit. The pen core unit is movably disposed inside pen-shaped casing structure, wherein the pen core unit includes a first movable portion passing through the first hollow electromagnetic body, a second movable portion partially exposed from the pen-shaped casing structure, and a stop portion connected between the first movable portion and the second movable portion. The second electromagnetic unit includes a second hollowing electromagnetic body fixed inside the pen-shaped casing structure and disposed around the first movable portion, wherein the second hollowing electromagnetic body is abutted against the stop portion and disposed between the first electromagnetic unit and the stop portion. The elastic unit is disposed inside the pen-shaped casing structure and between the first movable portion and a fixed structure that is disposed inside the pen-shaped casing structure, wherein the elastic unit includes at least one first elastic element adjacent to the first movable portion and at least one second elastic element far away from the first movable portion, the at least one first elastic element and the at least one second elastic element are connected in series and between the first movable portion and the fixed structure, and the elastic coefficient of the at least one first elastic element is smaller than that of the at least one second elastic element.

Therefore, because the design of the pen core unit including a first movable portion passing through the first hollow electromagnetic body, a second movable portion partially exposed from the pen-shaped casing structure, and a stop portion connected between the first movable portion and the second movable portion, the second hollowing electromagnetic body can be abutted against the stop portion for restricting the position of the second hollowing electromagnetic body.

To further understand the techniques, means and effects of the instant disclosure applied for achieving the prescribed objectives, the following detailed descriptions and appended drawings are hereby referred, such that, through which, the purposes, features and aspects of the instant disclosure can be thoroughly and concretely appreciated. However, the appended drawings are provided solely for reference and illustration, without any intention to limit the instant disclosure.

DETAILED DESCRIPTION OF THE PREFERRED EMBODIMENTS

First Embodiment

Figure 1:
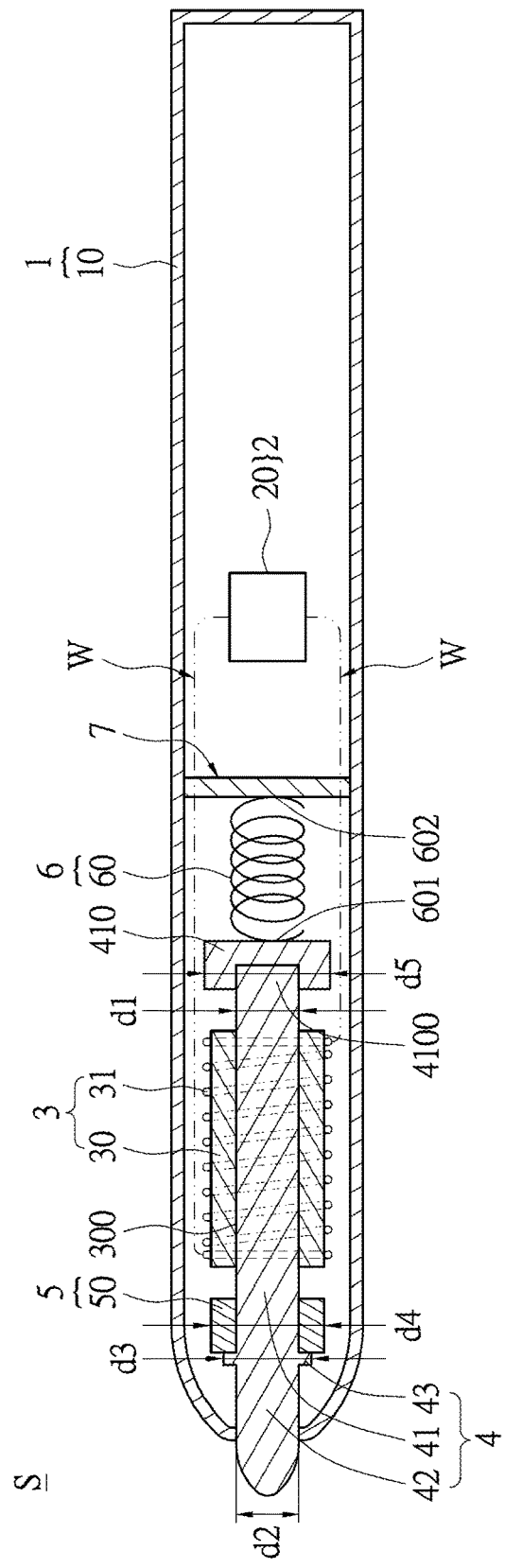
FIG. 1 shows a cross-sectional, schematic view of the micro touch pen structure according to the first embodiment of the instant disclosure.

Referring to FIG. 1, the first embodiment of the instant disclosure provides a micro touch pen (stylus pen) structure S, comprising: a casing unit 1, a circuit unit 2, a first electromagnetic unit 3, a pen core unit 4, a second electromagnetic unit 5 and an elastic unit 6.

First, the casing unit 1 includes a pen-shaped casing structure 10, and the circuit unit 2 is disposed inside the pen-shaped casing structure 10. For example, the circuit unit 2 includes at least one capacitor 20 electrically connected to the circuit unit 2, but it is merely an example and is not meant to limit the instant disclosure.

Moreover, the first electromagnetic unit 3 is fixed inside the pen-shaped casing structure 10 and electrically connected to the circuit unit 2 through two conductive lines W. The first electromagnetic unit 3 includes a first hollow electromagnetic body 30 fixed inside the pen-shaped casing structure 10 and at least one electromagnetic coil 31 wound around (disposed around or surroundingly disposed on) the first hollow electromagnetic body 30 and electrically connected to the circuit unit 2 through the two conductive lines W, and the first hollow electromagnetic body 30 has a through hole 300. In addition, the pen core unit 4 is movably disposed inside pen-shaped casing structure 10, and the pen core unit 4 includes a first movable portion 41 passing through the through hole 300 of the first hollow electromagnetic body 30, a second movable portion 42 partially exposed from (or exposed outside) the pen-shaped casing structure 10, and a stop portion 43 (a retaining ring or a stopper) connected between the first movable portion 41 and the second movable portion 42. More precisely, the third diameter d3 of the stop portion 43 is larger than the first diameter d1 of the first movable portion 41 and the second diameter d2 of the second movable portion 42. For example, the first movable portion 41, the stop portion 43 and the second movable portion 42 are sequentially connected with each other to form a single movable pen core structure, and the single movable pen core structure may be integrally (integratedly) made from non-permeability stainless steel materials.

Furthermore, the second electromagnetic unit 5 includes a second hollowing electromagnetic body 50 fixed inside the pen-shaped casing structure 10 and disposed around the first movable portion 41, and the second hollowing electromagnetic body 50 is abutted against the stop portion 43 and disposed between the first electromagnetic unit 3 and the stop portion 43. More precisely, the first hollow electromagnetic body 30 is larger than the second hollow electromagnetic body 50, and the fourth diameter d4 of the second hollow electromagnetic body 50 is larger than the third diameter d3 of the stop portion 43 for preventing the magnetic fields generated by the second hollow electromagnetic body 50 from being interfered by the stop portion 43. For example, the second hollow electromagnetic body 50 may be made of high permeability materials (such as any amorphous materials) by sintering. The second hollow electromagnetic body 50 also may be formed as a thin flexible magnet by mixing magnetic powders and soft gel (glue), thus it is easy to place the second hollow electromagnetic body 50 around the first movable portion 41.

Besides, the elastic unit 6 is disposed inside the pen-shaped casing structure 10 and between the first movable portion 41 and a fixed structure 7 that is disposed inside the pen-shaped casing structure 10. More precisely, the elastic unit 6 includes at least one elastic element 60 (such as a compression spring or an elastic piece) connected between the first movable portion 41 and the fixed structure 7. The at least one elastic element 60 has a first end 601 and a second end 602 opposite to the first end 601, the first end 601 of the at least one elastic element 60 is connected to the first movable portion 41, and the second end 602 of the at least one elastic element 60 is connected to the fixed structure 7. In addition, the first movable portion 41 has a stop structure 410 disposed between the first electromagnetic unit 3 and the elastic unit 6. The stop structure 410 is detachably disposed on an end portion 4100 of the first movable portion 41, and the fifth diameter d5 of the stop structure 410 is larger than the hole diameter (not labeled) of the through hole 300 of first hollow electromagnetic body 30, for preventing the first movable portion 41 of pen core unit 4 from being separated from the through hole 300 of first hollow electromagnetic body 30.

Figure 2:
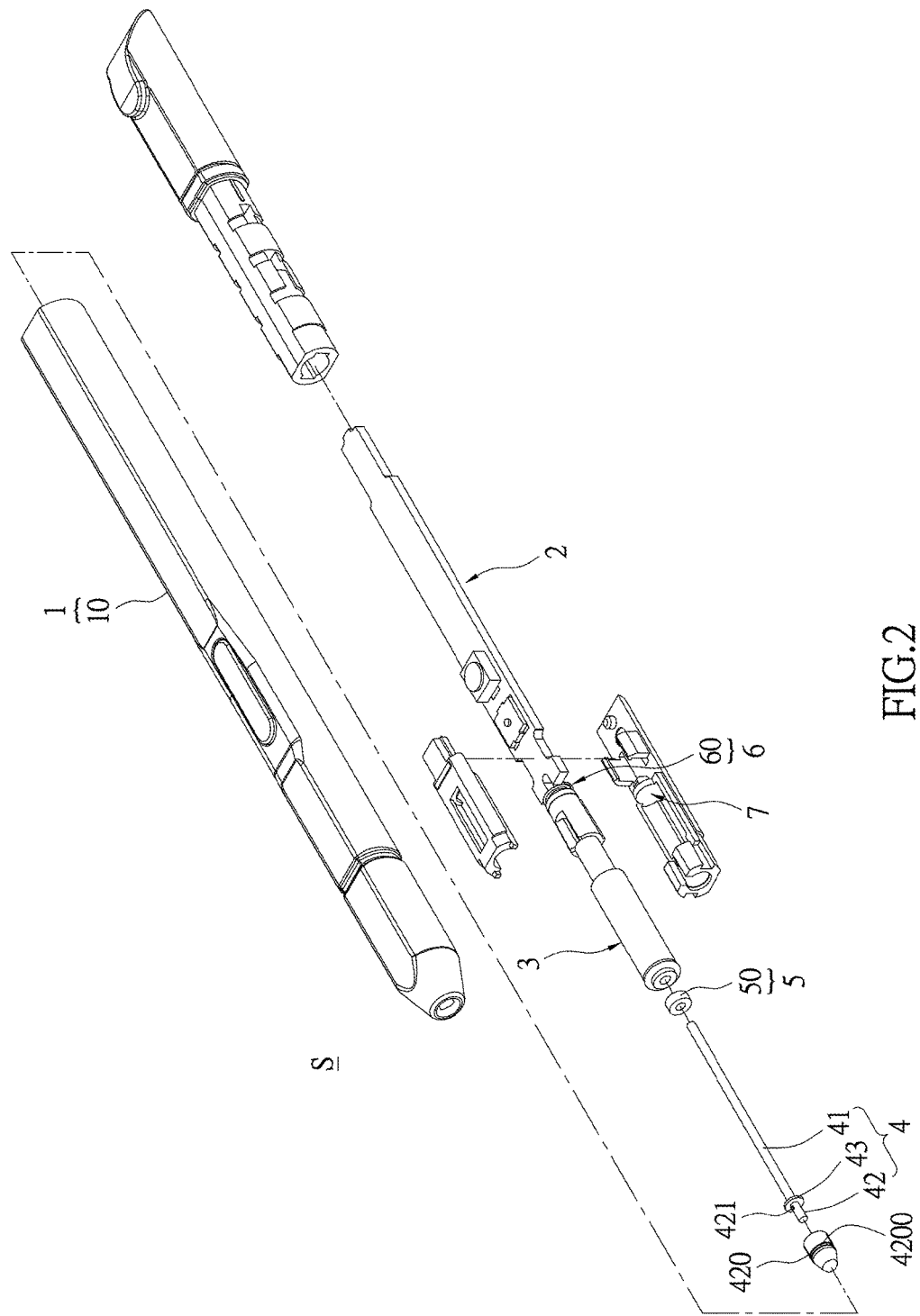
FIG. 2 shows an exploded, schematic view of the micro touch pen structure according to the first embodiment of the instant disclosure.
Figure 3:
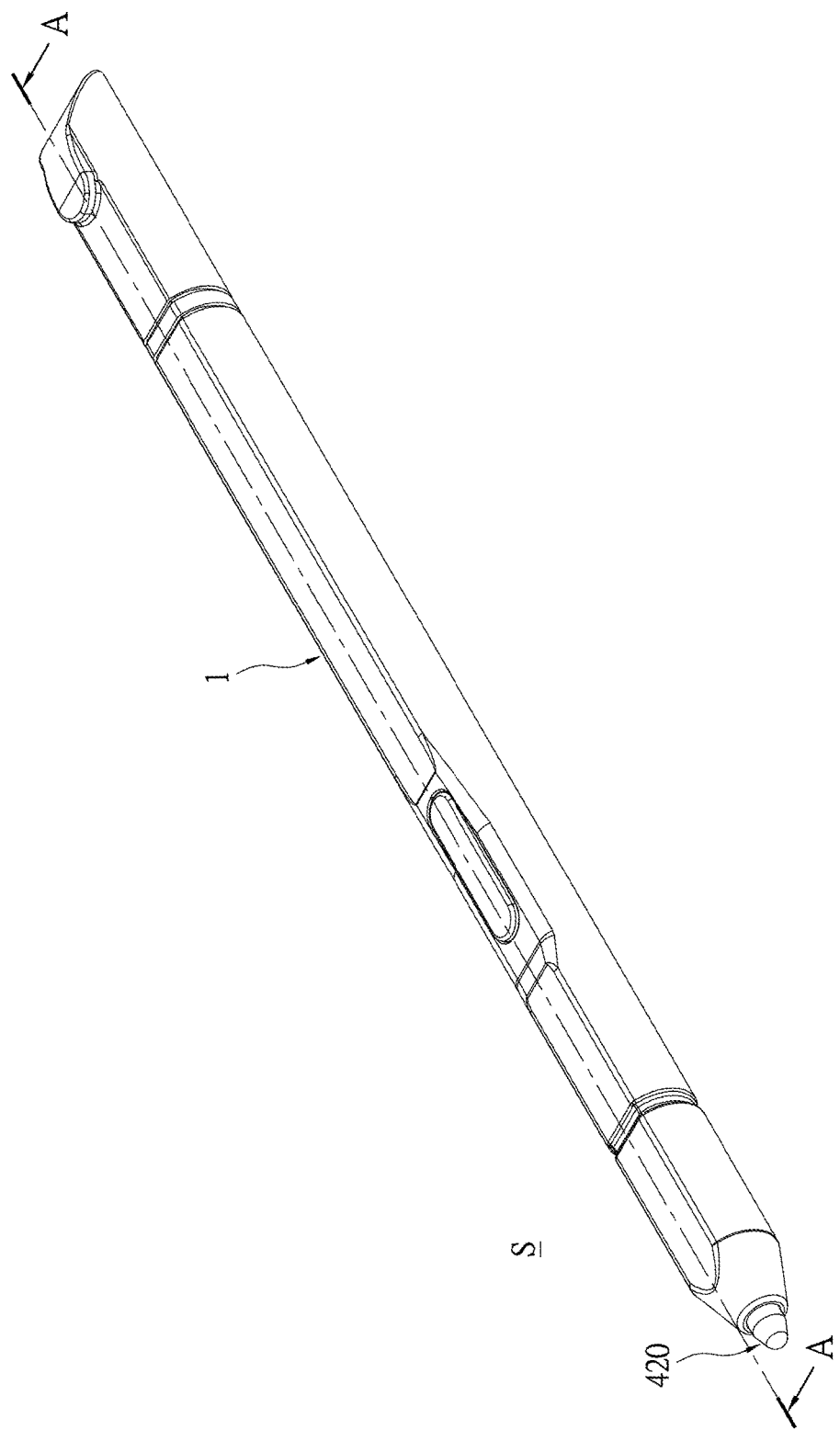
FIG. 3 shows an assembled, schematic view of the micro touch pen structure according to the first embodiment of the instant disclosure.
Figure 4:
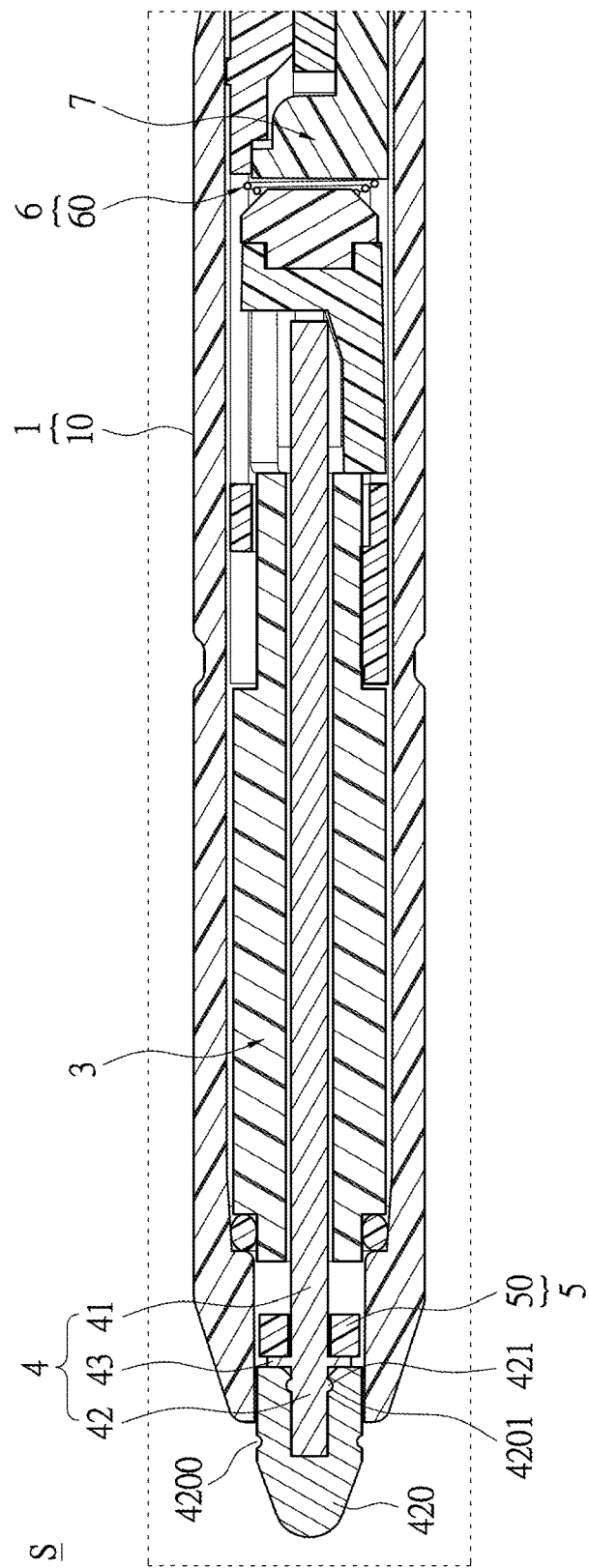
FIG. 4 shows a partial, cross-sectional, enlarged view taken along the section line A-A of FIG. 3.

Referring to FIG. 2 and FIG. 4, it is worth mentioning that the micro touch pen structure S further includes a plastic pen head cap 420 that is a replaceable pen head cap disposed on the second movable portion 42 for covering the exposed portion of the second movable portion 42, thus the aspect of the micro touch pen structure S is enhanced and the user can use the plastic pen head cap 420 to directly touch a handwritten board. More precisely, the second movable portion 42 includes a replaceable pen head cap (such as the plastic pen head cap 420) partially exposed from the pen-shaped casing structure 10 and abutted against the stop portion 43. The replaceable pen head cap 420 has an exposed annular concave portion 4200 disposed on the outer surface of the replaceable pen head cap 420. The replaceable pen head cap 420 has at least two first retaining portions 4201 disposed on the inner surface of the replaceable pen head cap 420, and the second movable portion 42 has at least two second retaining portions 421 respectively mated with the at least two first retaining portions 4201. Hence, it is easy for the user to replace the replaceable pen head cap 420 due to the design of respectively mating the at least two first retaining portions 4201 with the at least two second retaining portions 421.

Second Embodiment

Figure 5:
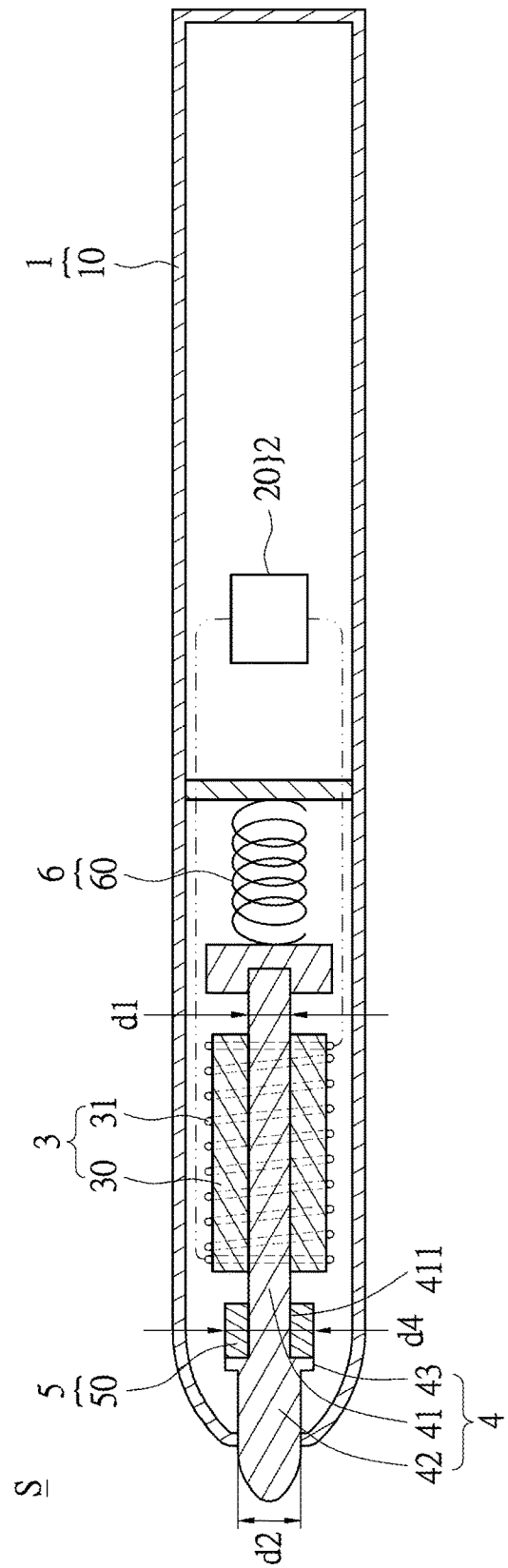
FIG. 5 shows a cross-sectional, schematic view of the micro touch pen structure according to the second embodiment of the instant disclosure.

Referring to FIG. 5, the second embodiment of the instant disclosure provides a micro touch pen structure S, comprising: a casing unit 1, a circuit unit 2, a first electromagnetic unit 3, a pen core unit 4, a second electromagnetic unit 5 and an elastic unit 6. Comparing FIG. 5 with FIG. 1, the difference between the second embodiment and the first embodiment is as follows: in the second embodiment, the first movable portion 41 has an annular concave area 411 adjacent to the stop portion 43, and the second hollow electromagnetic body 50 is surroundingly disposed on the annular concave area 411 of the first movable portion 41. More precisely, because the first diameter d1 of the first movable portion 41 is smaller than the second diameter d2 of the second movable portion 42, the fourth diameter d4 of the second hollow electromagnetic body 50 can be reduced for decreasing the thickness of the second hollow electromagnetic body 50.

Third Embodiment

Figure 6:
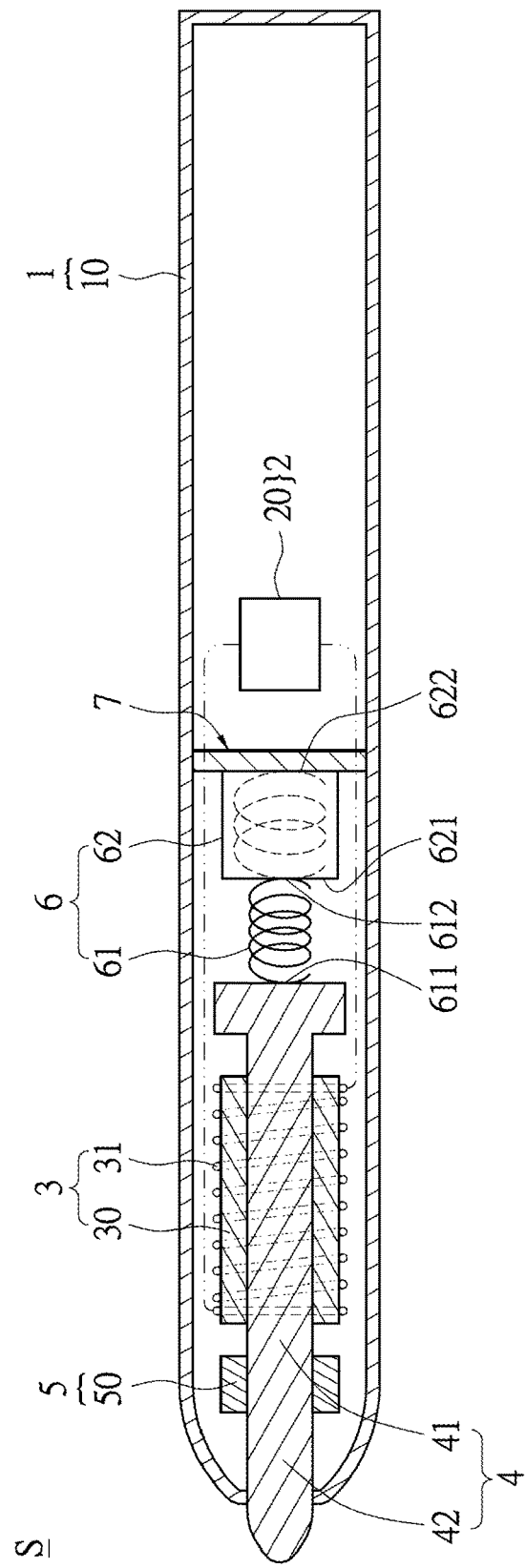
FIG. 6 shows a cross-sectional, schematic view of the micro touch pen structure according to the third embodiment of the instant disclosure.

Referring to FIG. 6, the third embodiment of the instant disclosure provides a micro touch pen structure S, comprising: a casing unit 1, a circuit unit 2, a first electromagnetic unit 3, a pen core unit 4, a second electromagnetic unit 5 and an elastic unit 6. Comparing FIG. 6 with FIG. 1, the difference between the third embodiment and the first embodiment is as follows: in the third embodiment, the pen core unit 4 includes a first movable portion 41 passing through the first hollow electromagnetic body 30 and a second movable portion 42 connected to the first movable portion 41 and partially exposed from the pen-shaped casing structure 10. The second hollowing electromagnetic body 50 of the second electromagnetic unit 5 is disposed between the first electromagnetic unit 3 and the second movable portion 42. The elastic unit 6 includes at least one first elastic element 61 adjacent to the first movable portion 41 and at least one second elastic element 62 far away from the first movable portion 41. The at least one first elastic element 61 and the at least one second elastic element 62 are connected in series and between the first movable portion 41 and the fixed structure 7, and the elastic coefficient of the at least one first elastic element 61 is smaller than that of the at least one second elastic element 62.

More precisely, the at least one first elastic element 61 has a first end 611 and a second end 612 opposite to each other, and the at least one second elastic element 62 has a first end 621 and a second end 622 opposite to each other. The first end 611 of the at least one first elastic element 61 is connected to the first movable portion 41, the second end 612 of the at least one first elastic element 61 and the first end 621 of the at least one second elastic element 62 are connected with each other, and the second end 622 of the at least one second elastic element 62 is connected to the fixed structure 7.

Whereby, the micro touch pen structure S of the third embodiment can provide a two-step press feeling for the user due to the design of connecting the at least one first elastic element 61 and the least one second elastic element 62. In other words, when the pen core unit 4 is pressed within the range of a predetermined pressure, only the at least one first elastic element 61 is compressed. When the pen core unit 4 is pressed over the range of a predetermined pressure, both the at least one first elastic element 61 and the least one second elastic element 62 are sequentially or concurrently compressed.

Fourth Embodiment

Figure 7:
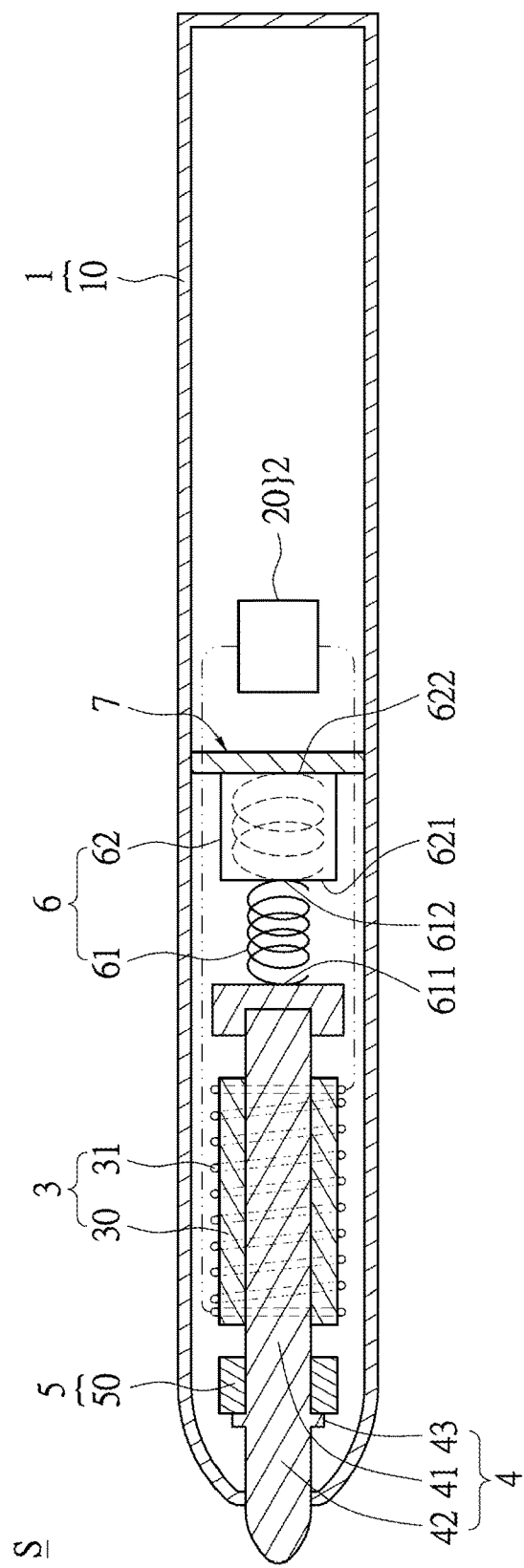
FIG. 7 shows a cross-sectional, schematic view of the micro touch pen structure according to the fourth embodiment of the instant disclosure.

Referring to FIG. 7, the fourth embodiment of the instant disclosure provides a micro touch pen structure S, comprising: a casing unit 1, a circuit unit 2, a first electromagnetic unit 3, a pen core unit 4, a second electromagnetic unit 5 and an elastic unit 6. Comparing FIG. 7 with FIG. 5, the difference between the fourth embodiment and the third embodiment is as follows: in the fourth embodiment, the pen core unit 4 includes a first movable portion 41 passing through the first hollow electromagnetic body 30, a second movable portion 42 partially exposed from the pen-shaped casing structure 10, and a stop portion 43 connected between the first movable portion 41 and the second movable portion 42.

In conclusion, because the design of the pen core unit 4 including a first movable portion 41 passing through the first hollow electromagnetic body 30, a second movable portion 42 partially exposed from the pen-shaped casing structure 10, and a stop portion 43 connected between the first movable portion 41 and the second movable portion 42, the second hollowing electromagnetic body 50 can be abutted against the stop portion 43 for restricting the position of the second hollowing electromagnetic body 50.

The above-mentioned descriptions merely represent the preferred embodiments of the instant disclosure, without any intention or ability to limit the scope of the instant disclosure which is fully described only within the following claims. Various equivalent changes, alterations or modifications based on the claims of instant disclosure are all, consequently, viewed as being embraced by the scope of the instant disclosure.

The invention claimed is:

1. A stylus pen comprising:
   a pen-shaped case;
   circuitry;
   an electromagnetic unit fixed inside the pen-shaped case and electrically connected to the circuitry, wherein the first electromagnetic unit includes a first hollow body fixed inside the pen-shaped case and at least one electromagnetic coil wound around the first hollow body and electrically connected to the circuitry;
   a pen core movably disposed inside the pen-shaped case, wherein the pen core includes a movable portion passing through the first hollow body and partially exposed from the pen-shaped case; and
   a magnetic unit including a second hollow body made of material having magnetic permeability, wherein the magnetic unit is fixed to the pen core and moves while the pen core moves,
   wherein the pen core further includes a stop portion fixed to the second magnetic unit,
   wherein the stop portion has a diameter that is larger than a diameter of a through hole of the second hollow body, and
   wherein the stop portion abuts the second hollow body and supports the magnetic unit, the stop portion and the magnetic nit moving together when a pressure is applied to the movable portion of the pen core.

2. The stylus pen according to claim 1, wherein the diameter of the stop portion is smaller than a diameter of the second hollow body.

3. The stylus pen according to claim 1, further including:
   a fixed structure disposed inside the pen-shaped case and fixed with the pen-shaped case; and
   an elastic structure disposed inside the pen-shaped case between the pen core and the fixed structure,
   wherein the elastic structure includes at least one first elastic element disposed adjacent to the pen core and at least one second elastic element disposed away from the pen core, and the at least one first elastic element and the at least one second elastic element are connected in series and are disposed between the pen core and the fixed structure.

4. The stylus pen according to claim 3, wherein a first end of the at least one second elastic element is connected to the at least one first elastic element and a second end of the at least one second elastic element is connected to the fixed structure.

5. The stylus pen according to claim 4, wherein an elastic coefficient of the at least one first elastic element is different from an elastic coefficient of the at least one second elastic element.

6. The stylus pen according to claim 5, wherein the elastic coefficient of the at least one first elastic element is smaller than the elastic coefficient of the at least one second elastic element.

* * * * *

UNITED STATES PATENT AND TRADEMARK OFFICE
CERTIFICATE OF CORRECTION

Page 1 of 1

PATENT NO. : 10,037,090 B2
APPLICATION NO. : 15/473107
DATED : July 31, 2018
INVENTOR(S) : Chien-Chia Lien It is certified that error appears in the above-identified patent and that said Letters Patent is hereby corrected as shown below:

In the Claims

Column 7, Line 8 Claim 1:
"first electromagnetic unit includes a first hollow body" should read, --electromagnetic unit includes a first hollow body--.

Column 7, Line 28 Claim 1:
"magnetic nit moving together when a pressure is" should read, --magnetic unit moving together when a pressure is--.

Signed and Sealed this
Sixth Day of November, 2018

Andrei Iancu
*Director of the United States Patent and Trademark Office*